United States Patent [19]

Broadbent

[11] Patent Number: 4,800,106

[45] Date of Patent: Jan. 24, 1989

[54] GLOSS ENHANCEMENT OF AUTODEPOSITED COATINGS

[75] Inventor: Ronald W. Broadbent, Ardsley, Pa.

[73] Assignee: Amchem Products, Inc., Ambler, Pa.

[21] Appl. No.: 64,966

[22] Filed: Jun. 19, 1987

[51] Int. Cl.$^4$ .................... B05D 3/00; B05D 3/02
[52] U.S. Cl. .................... 427/388.1; 427/353; 427/385.5; 427/388.4
[58] Field of Search ............... 427/388.4, 388.1, 385.5, 427/435, 352, 353; 428/461, 463

[56] References Cited

U.S. PATENT DOCUMENTS

| | | | |
|---|---|---|---|
| 2,973,285 | 2/1961 | Berke et al. | 427/341 |
| 3,617,368 | 11/1971 | Gibbs et al. | 428/336 |
| 3,647,567 | 3/1972 | Schweri | 148/6 |
| 3,709,743 | 1/1973 | Dalton et al. | 427/309 |
| 3,922,451 | 11/1975 | Anschutz et al. | 427/389.7 |
| 4,030,945 | 6/1977 | Hall et al. | 148/6 |
| 4,191,676 | 3/1980 | Hall | 427/435 |
| 4,313,861 | 2/1982 | Bassett et al. | 427/435 |
| 4,347,172 | 8/1982 | Nishida et al. | 524/575 |
| 4,379,188 | 4/1983 | Zimmerman et al. | 427/341 |
| 4,411,950 | 10/1983 | Smith | 428/461 |
| 4,435,478 | 3/1984 | Burgess et al. | 427/388.4 |
| 4,562,098 | 12/1985 | Ahmed | 427/388.4 |
| 4,637,839 | 1/1987 | Hall | 427/388.4 |
| 4,647,480 | 3/1987 | Ahmed | 427/388.4 |

*Primary Examiner*—Norman Morgenstern
*Assistant Examiner*—Marianne L. Padgett
*Attorney, Agent, or Firm*—Ernest G. Szoke; Henry E. Millson, Jr.; Real J. Grandmaison

[57] ABSTRACT

A process of enhancing the gloss and retaining the corrosion resistance of an autodeposited coating on a metallic surface by contacting the coating with a reaction rinse solution containing an amphoteric surface active agent and an alkaline material, and then rinsing the coating, preferably with deionized water. The coating preferably comprises a vinylidene chloride copolymer, and the metallic surface preferbly comprises a ferriferrous surface.

16 Claims, No Drawings

GLOSS ENHANCEMENT OF AUTODEPOSITED COATINGS

BACKGROUND OF THE INVENTION

This invention relates to the treatment of autodeposited coatings, and more specifically, to the gloss enhancement of autodeposited coatings of the type formed from autodepositing compositions while maintaining the corrosion resistance properties thereof.

DISCUSSION OF RELATED ART

Autodeposition involves the use of any aqueous resinous coating composition of low solids concentration, usually less than about 10%, to form a coating of high solids concentration, usually greater than about 10%, on a metallic surface immersed therein, with the coating increasing in thickness or weight the longer the time the metallic surface is immersed in the composition. Autodeposition is similar to electrodeposition, but does not require the aid of external electrical current to cause the resin particles to deposit on the metal surface. In general, autodepositing compositions are aqueous acid solutions having solid resin particles dispersed therein.

Autodepositing compositions can be used to form coatings which have good aesthetic properties and which protect the underlying metallic substrate from being degraded, such as for example, corroded by water. However, there are certain applications which require that the autodeposited coating have particularly good properties for satisfactory use. Various means have been developed to improve the properties of autodeposited coatings, including, for example, chemical pretreatment of the metallic surface prior to formation of the coating; selection of particular resins for use in forming the coating; in addition to the autodepositing composition of chemical additives; and chemical treatment of the freshly formed or uncured coating.

Various chemical treatments of uncured autodeposited coatings for the purpose of improving the properties of the cured coating have been reported. For example, U.S. Pat. No. 4,030,945 and Canadian Pat. No. 1,089,155 teach the treatment of freshly formed autodeposited coatings with acidic aqueous solutions of one or more chromium compounds to improve the corrosion resistance and/or surface appearance of the cured coating. Japanese Pat. No. 7,630,247 teaches such treatment with an aqueous solution or dispersion of a vulcanizing agent, for example, a sulfur-containing compound, or a vulcanizing accelerator (such as hexamethylene-tetramine) to improve the solvent resistance of the cured coating. In Japanese Pat. No. 7,630,246, it is disclosed that adhesion of the freshly formed or wet coating to the underlying metallic substrate can be improved by contacting the coating with an acidic aqueous solution of an inorganic or organic acid or of an oxidizing agent, such as sodium permanganate. This in turn leads to the provision of cured coatings which have a more uniform and appealing appearance. U.S. Pat. No. 3,647,567 also teaches the use of an acidic aqueous solution, namely phosphoric acid, as well as of chromium troxide and water or acid soluble chromates and dichromates to improve the corrosion resistance of the resinous coatings described therein. In addition, Japanese Pat. No. 7,630,245 discloses the treatment of an uncured autodeposited coating with an aqueous composition containing a water miscible coalescing agent comprising a compound having two or more oxygen-containing functional groups such as ester groups, hydroxy groups, carbonyl groups and ether linkages. Examples of such classes of compounds include alcohols, ketones, alcohol esters, ketone esters, ketone ethers and ester ethers. This Japanese patent discloses that the treatment of uncured autodeposited coatings with such coalescing agents inhibits or deters the tendency of the cured form of the coating to blister, crack, and/or bridge.

Chemical treatment of uncured autodeposited coatings, as described above, are ineffective in rendering the coating more impermeable to fluids and/or create waste disposal problems and/or suffer from other drawbacks, including, for example, relatively high use costs. In addition, the cured coatings are typically dull, lacking in gloss and aesthetic appeal. Accordingly, it is an object of this invention to overcome the afore-noted disadvantage of the prior art and provide cured autodeposited coatings have an enhanced gloss as well as maintained corrosion resistance.

DESCRIPTION OF THE INVENTION

Other than in the operating examples, or where otherwise indicated, all numbers expressing quantities of ingredients or reaction conditions used herein are to be understood as modified in all instances by the term "about".

In accordance with this invention, improvements in the appearance and in the properties of cured autodeposited coatings are obtained by treating the uncured autodeposited coating with an amphoteric surface active agent. The improvement in appearance of the cured autodeposited coatings resides in the fact that after treatment of the uncured autodeposited coatings in accordance with this invention, the cured coatings have a substantially increased gloss. In addition, after treatment of the autodeposited coatings pursuant to this invention, the coatings also have an excellent accelerated corrosion resistance.

In a preferred embodiment of this invention, the uncured autodeposited coatings are treated with an amphoteric surface active agent and an alkali metal salt, and then rinsed with deionized water. This alternative embodiment is preferred because the treatment of autodeposited coatings therewith enables ease of control of the treatment process, and provides enhanced gloss and performance properties thereto such as continued resistance to water soak, humidity and neutral salt spray.

More particularly, this invention comprises a process for enhancing the gloss and retaining the accelerated corrosion resistance of an autodeposited coating on a metallic surface comprising contacting an uncured form of said coating with an amphoteric surface active agent, preferably including an alkaline material. In addition, optimum results are obtained when the autodeposited coating is contacted with a solution of the amphoteric surface active agent and an alkaline material as a reaction rinse, followed by a rinse with deionized water. The inclusion of alkaline material to the reaction rinse has been found to provide some improvement in the gloss of the cured autodeposited coating. It has been noted that treatment of the autodeposited coating with a solution of only the amphoteric surface active agent provides poorer performance in water-soak resistance and a loss of gloss when multivalent cations are present in the reaction rinse solution. However, in accordance with this invention, optimum results are obtained when the reaction rinse comprises the combination of an amphoteric surface active agent and an alkaline material to provide a solution having a pH of at least about 7, and the thus treated autodeposited coating is then rinsed with deionized water.

In accordance with this invention, the amphoteric surface active agent may be selected from the group consisting of amines, substituted and unsubstituted polyamines, betaines and amidobetaines. The amphoteric surface active agent is preferably a betaine or an amidobetaine. More specifically, the amphoteric surface active agent selected from the amines may comprise an amine oxide, for example, cocamidopropylamine oxide having the empirical formula

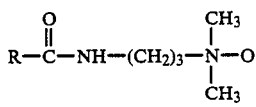

where R=coco.

Further, the amphoteric surface active agent selected from the polyamines may comprise a fatty acid polyamine such as PEG-15 tallow polyamine commercially available under the tradename "Polyquart H" from Henkel Corporation, Chemical Specialties Division, Hoboken, NJ. In addition, the amphoteric surface active agent selected from the betaines may comprise a fatty acid betaine such as a cocobetaine having the empirical formula

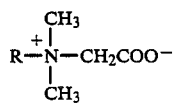

where R=coco.

Still further, the amphoteric surface active agent selected from an amidobetaine may comprise a fatty acid amidoalkyl betaine, for example, cocamidopropyl betaine having the empirical formula

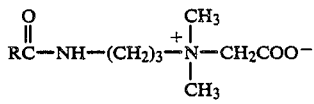

where R=coco.

In accordance with this invention, the alkaline material is preferably an aqueous alkaline solution of ammonium hydroxide or an alkali metal hydroxide such as, for example, lithium hydroxide, potassium hydroxide, and sodium hydroxide, although other alkaline materials which may be used include the amines, silicates, phosphates and carbonates.

The amount of amphoteric surface active agent employed in accordance with this invention may be from about 0.05 to about 5% by weight, and is preferably from about 0.1 to about 1.0% by weight based on the weight of the reaction rinse solution. The amount of alkaline material employed in accordance with this invention may be from about 0.01 to about 2.5% by weight, based on the weight of the reaction rinse solution, as long as the pH of the reaction rinse system is at least about 7.

In accordance with this invention, the autodeposited coatings which are treated pursuant to this invention are preferably formed from an auto-depositing composition in which particles of resin are dispersed in an aqueous solution which is prepared by combining hydrofluoric acid and a soluble ferric iron-containing ingredient, most preferably ferric fluoride. Preferred resins for use in forming autodeposited coatings which are treated according to the present invention comprise internally stabilized vinylidene chloride copolymers containing in excess of 50 wt. % vinylidene chloride. Most preferably, the vinylidene chloride copolymer is capable of developing a crystalline structure.

The significance of the present invention can be appreciated readily when it is considered that autodeposited coatings formed from the aforementioned type of preferred autodepositing composition have exceptionally good corrosion resistant properties as evidenced by the ability of such coatings to pass 5% neutral salt spray test (ASTM B-117) at 95° F. for 500 hours or more, such corrosion resistant properties being obtained without subjecting the uncured form of the coating to chromium or other treatment of the type conventionally used to improve the corrosion resistance of autodeposited coatings. Nevertheless, such coatings suffer loss of adhesion to the underlying metallic substrate when subjected to soaking in water for extended periods of time. Such loss of adhesion can be inhibited or deterred by treating the uncured form of the coating with an alkaline material pursuant to U.S. Ser. No. 635,968 filed July 31, 1984, commonly assigned as is the present application.

Practice of the present invention provides means for providing autodeposited coatings which can be used in applications where the coatings would not otherwise be suitable. Other advantages which are attendant for the use of the present invention will be evident from the detailed description of the invention which follows.

Coating compositions which form autodeposited coatings of the type that can be treated in accordance with the present invention generally comprise resin-containing acidic aqueous compositions which function to attack and dissolve from a metallic surface contacted therewith wherein metal ions in an amount sufficient to directly or indirectly cause resin particles in the region of the metallic surface to deposit thereon in a continuous fashion, that is, in a manner such that there is a build-up in the amount of resin deposited on the surface the longer the time the surface is in contact with the composition. This deposition of the resin on the metallic surface is achieved through chemical action of the coating composition on the metallic surface. The use of electricity which is necessary for the operation of electrocoating methods is not required.

Basic constituents of an autodepositing composition are water, resin solids dispersed in the aqueous medium of the composition and activator, that is, an ingredient(s) which converts the water/resin composition into one which will form on a metallic surface a resinous coating which increases in thickness or weight the longer the surface is immersed in the composition. Various types of activators or activating systems are known, for example, as reported in U.S. Pat. Nos.: 3,592,699; 3,709,743; 4,103,049; 4,347,172; and 4,373,050, the disclosures of which are incorporated herein by reference. The activating system generally comprises an acid/oxidizing system, for example: hydrogen peroxide and HF; HNO₃; and a ferric-containing compound and HF; and other soluble metal-containing compounds, for example, silver fluoride, ferrous oxide, cupric sulfate, cobaltous nitrate, silver acetate, ferrous phosphate, chromium fluoride, cadmium fluoride, stannous fluoride, lead dioxide, and silver nitrate in an amount between about 0.025 and about 50 g/l, and an acid that can be used alone or in combination with hydrofluoric acid, and including, for example, sulfuric, hydrochloric nitric, and phosphoric acid, and an organic acid, including, for example, acetic, chloracetic, and trichloracetic acid.

The preferred activating system comprises a ferric-containing compound and hydrofluoric acid. Thus, a preferred autodepositing composition comprises a soluble ferric-containing compound in an amount equivalent to about 0.025 to about 3.5 g/l ferric ion, most preferably about 0.3 to about 2.0 g/l of ferric iron, and hydrofluoric acid in an amount sufficient to impart to the composition a pH within the range of about 1.0 to about 5.0. Examples of the aforementioned ferric-containing compounds are ferric nitrate, ferric chloride, ferric phosphate, ferric oxide, and ferric fluoride, the last mentioned being preferred.

U.S. Pat. Nos. 4,347,172 and 4,411,937, which disclose the aforementioned type of preferred activating system disclose the optional use in the composition of an oxidizing agent in an amount to provide from about 0.01 to about 0.2 oxidizing equivalent per liter of composition. Suitable oxidizing agents are those commonly known as depolarizers. Examples of oxidizing agents are hydrogen peroxide, dichromate, permanganate, nitrate, persulfate, perborate, p-benzoquinone and p-nitrophenol. Hydrogen peroxide is mentioned as preferred. The preferred composition for use in the present invention does not include the use of an optional oxidizing agent as disclosed in the aforementioned U.S. Pats. Nos. 4,347,172 and 4,411,937.

With respect to the resin constituent of the autodepositing composition, although any resin suitable for use in an autodepositing composition can be used, it is preferred that the coating which is treated in accordance with the present invention comprise a resin made from a high proportion of vinylidene chloride monomer, including externally and internally stabilized vinylidene chloride-containing resins, the preferred class of resins being internally stabilized vinylidene chloride-containing resins. In effect, internally stabilized polymers or resins include as part of their chemical structure a surfactant group which functions to maintain polymer particles or resin solids in a dispersed state in an aqueous medium, this being the function also performed by an "external surfactant", that is, by a material which has surfaceactive properties and which is adsorbed on the surface of resin solids, such as those in colloidal dispersion. As is known, the presence of an external surfactant tends to increase the water sensitivity of coatings formed from aqueous resin dispersions containing the same and to adversely affect desired properties of the coatings. The presence of undue amounts of surfactant in autodepositing compositions can lead to problems, as described in U.S. Pat. No. 4,191,676, the disclosure of which is incorporated herein by reference, particularly as regards to its description respecting surfactants and amounts thereof in autodepositing compositions. As discussed in said patent, the presence of an undue amount of surfactant in autodepositing compositions can deter the build-up of resin particles on the metallic surface being coated. In addition, the presence of undue amounts of surfactant can also adversely affect desired coating properties, for example, corrosion resistant properties. An advantage of internally stabilized vinylidene chloride-containing polymers is that stable aqueous dispersions, including acidic aqueous dispersions of the type comprising autodepositing compositions, can be prepared without utilizing external surfactants. It should be noted that there is a tendency in the literature to use interchangeably the following terms in connection with describing surface active material which are used in polymerization processes for preparing polymers of the type to which the present invention relates, i.e., surfactant, wetting agent, emulsifier or emulsifying agent and dispersing agent. As used herein, the term "surfactant" is intended to be synonymous with the aforementioned. Various types of internally stabilized vinylidene chloride-containing polymers are known and species thereof are available commercially. In accordance with the present invention, they can be used to excellent advantage in the practice of the present invention.

Various surfactants which function to maintain polymeric particles in dispersed state in aqueous medium include organic compounds which contain ionizable groups in which the anionic group is bound to the principal organic moiety of the compound, with the cationic group being a constituent such as, for example, hydrogen, an alkali metal, and ammonium. Speaking generally, exemplary anionic groups of widely used surfactants contain sulfur or phosphorous, for example, in the form of sulfates, thiosulfates, sulfonates, sulfinates, sulfaminates, phosphates, pyrophosphates and phosphonates. Such surfactants comprise inorganic ionizable groups linked to an organic moiety.

Although various ways may be used to introduce into the molecular structure of the vinylidene chloride resin such ionizable groups, it is believed that the most widely used method for preparing such resins will involve reacting vinylidene chloride with a monomeric surfactant and optionally one or more other monomers. In such reaction, the monomeric surfactant comprises a material which is polymerizable with monomeric vinylidene chloride or with a monomeric material which is polymerizable with monomeric vinylidene chloride and which is ionizable in the reaction mixture and in the acidic aqueous medium comprising autodepositing compositions.

With respect to particular resins that can be used in the coating composition of the present invention, a preferred class can be prepared by copolymerizing (A) vinylidene chloride monomer with (B) monomers such as methacrylic acid, methyl methacrylate, acrylonitrile, and vinyl chloride and (C) a water soluble ionic material such as sodium sulfoethyl methacrylate. Although the constituents comprising the above-desired resin can vary over a relatively wide range, in general the resin will comprise the polymerized constituents in the following amounts:

(1) between 45 and about 99 weight percent based on the total weight of monomers used of vinylidene chloride monomer;

(2) from about 0.5 to 30 weight percent based on the total weight of (1) and (2) of a second relatively more hydrophilic ethylenically unsaturated monomeric material wherein such monomeric material has a solubility in both the water phase and the oil phase of the polymer latex of at least 1 weight percent at the temperature of polymerization; and (3) from about 0.1 to about 5 weight percent based on the total weight of other monomers of an ionic significantly water-soluble material which is copolymerizable with (2) and is selected from the group of sulfonic acids and their salts having the following formula:

$$R-Z-Q-(SO_3)^--M^+$$

Examples of resins prepared from such monomers are disclosed in U.S. Pat. No. 3,617,368. As disclosed in said patent, the radical "R" is selected from the group consisting of vinyl and substituted vinyl, for example, alkyl-substituted vinyl; the symbol "Z" represents a difunctional linking group which will activate the double bond in the vinyl group; "Q" is a divalent hydrocarbon having its valence bonds on different carbon atoms; and the symbol "M+" represents a cation.

The relatively hydrophilic monomers of (2) above include those materials which are readily copolymerizable with (1) in aqueous dispersion, that is, which copolymerize within a period of about 40 hours at a temperature ranging from the freezing point of the monomeric serum up to about 100° C., and which have a solubility in both the water and the oil phase of the polymer latex of at least 1 weight percent at the temperature of polymerization. Exemplary of preferred materials, particularly when used in conjunction with monomeric vinylidene chloride are: methacrylic acid and methyl methacrylate. Other monomers which may be advantageously employed include the hydroxyethyl and propyl acrylates, hydroxyethylmethacrylate, ethyl hexylacrylate, acrylic acid, acrylonitrile, methacrylonitrile, acrylamide, and the lower alkyl and dialkylacrylamides, acrolein, methylvinyl ketone, and vinyl acetate.

These monomers, which can be employed in amounts of from 0.5 to 30 weight percent, based on the total weight of the nonionic monomers used, provide for the necessary reactivity with the copolymerizable ionic material of (3) and also provide for the required water solubility of the interpolymer in water. Thus, such materials may be referred to as "go-between" monomers. It is to be understood that the optimum amount of such relatively hydrophilic monomers may vary somewhat within the prescribed range depending upon the amount of hydrophobic monomer used in preparing the resin, as well as upon the amount and type of the copolymerizable ionic monomer used.

The copolymerizable ionic monomers used in preparing the aforementioned type resins are those monomeric materials which contain in their structure both an ionizable group and a reactive double bond, are significantly soluble in water, are copolymerizable with the hydrophilic monomer constituent (2) and in which the substituent on the double bond is chemically stable under the conditions normally encountered in emulsion polymerization. Examples of the difunctional linking group "Z" which will activate the double bond present in the vinyl group include groups of the structure:

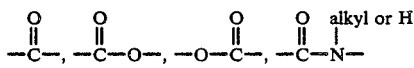

and the like. The alkyl group is preferably alkyl of 1 to 8 carbon atoms, especially methyl, ethyl or propyl. Examples of the aforementioned divalent hydrocarbon having its valence bonds on different carbon atoms include alkylene and arylene divalent hydrocarbon radicals. Although the alkylene ($CH_2$) group can contain up to about 20 carbon atoms, it will generally have 1 to about 8 carbon atoms.

The solubility of the defined copolymerizable ionic material as described herein is strongly influenced by the cation "M+". Exemplary cations are the free acids, alkali metal salts, ammonium and amine salts and sulfonium and quaternary ammonium salts. Preferred are the free acids, alkali metal salts, particularly sodium and potassium, and ammonium salts.

It is further noted that, with one of the ions above, and the usual choices for "R" and "Z", the solubility of the monomer depends on the "Q". As indicated, this group can be either aliphatic or aromatic and its size will determine the hydrophilic/hydrophobic balance in the molecule, that is, if "Q" is relatively small, the monomer is water soluble, but as "Q" becomes progressively larger the surface activity of such monomer increases until it becomes a soap and ultimately a water insoluble wax. It is to be understood, however, that the limiting size of "Q" depends on "R", "Z", and "M+". As exemplary of the above, it has been found that sodium sulfoakyl methacrylate of the formula:

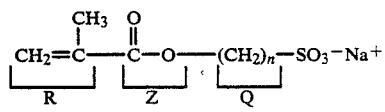

wherein n is 2, is a highly acceptable copolymerizable ionic material for use in the present invention.

Further, the selection of "R" and "Z" is governed by the reactivity needed and the selection of "Q" is usually determined by the reaction used to attach the sulfonic acid to the base monomer (or vice versa).

Processes for preparing latexes containing resins of the aforementioned type are known, such latexes, being commercially available and being referred to herein as "self-stabilizing latexes", that is, latexes, the polymeric particles of which contain in the polymer molecule functional groups that are effective in maintaining the polymeric particles dispersed in the aqueous phase of the latex. As mentioned above, such latexes do not require the presence of an external surfactant to maintain the particles in their dispersed state. Latexes of this type generally have a surface tension very close to that of water i.e., about 72 dynes/cm. It has been observed that autodepositing compositions containing such latexes form coatings which build-up at a relatively fast rate.

An exemplary method for preparing such latexes involves preparation of an aqueous dispersion by an essentially continuous, carefully controlled addition of the requisite polymerization constituents, including polymerization initiator systems, if desired, to the aqueous medium. In such process, it is often preferred to first add a small amount of the monomeric materials to the aqueous medium having the desired pH value, followed by the subsequent addition of the necessary polymerization initiator, to form a polymeric seed latex in order to aid in the control of particle size. When forming such polymeric seed latexes, very small amounts of conventional surfactants, such as alkali metal soaps or the like, may be incorporated in the aqueous medium to further aid in the attainment of particles of desired size. The addition of such surfactants, however, is not critical for the production of the highly stable, internally stabilized, aqueous colloidal dispersions of polymeric particles of the type described above. In any event, additions of surfactants are limited so that the total amount present in the aqueous phase of the final coating solution is less than the critical micelle concentration, as taught in the aforementioned U.S. Pat. No. 4,191,676. Following the formation of the polymeric seed latex, the remaining polymerization constituents are simultaneously and continuously added under carefully controlled conditions to the aqueous medium.

Highly stable polymer latexes for use in the present invention are characterized by the virtual absence of undesirable coagulum which often results when polymeric latexes are stabilized by conventional water soluble surfactants. Thus, such latexes combine the highly beneficial properties of optimum colloidal stability, reduced viscosities at relatively high polymer solids content, low foaming tendencies and excellent product uniformity and reproducibility. Such highly stable latexes which are internally stabilized are disclosed, for example, in the aforementioned, U.S. Pat. No. 3,617,368.

A preferred embodiment of this invention comprises the use of vinylidene chloride-containing latexes in which a water soluble ionic material such, as for example, sodium sulfoethyl methacrylate is copolymerized with the comonomers comprising the copolymer. Sodium sulfoethyl methacrylate is particularly effective for use with monomeric vinylidene chloride and the relatively hydrophilic monomers methyl methacrylate or methacrylic acid when used in the amounts and in the manner called for by the present invention.

Particularly preferred latexes for use in this invention include latexes with about 35 to about 60 weight % of solids comprising a polymeric composition prepared by emulsion polymerization of vinylidene chloride with one or more comonomers selected from the group consisting of vinyl chloride, acrylic acid, a lower alkyl acrylate such as methyl, ethyl and butyl acrylate, methacrylic acid, methyl methacrylate, acrylonitrile, methacrylonitrile, acrylamide, and methacrylamide stabilized with sulfonic acid or sulfonic acid salt of the formula:

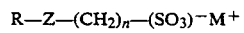

wherein "R" represents vinyl or lower alkyl-substituted vinyl, "Z" represents one of the functional groups:

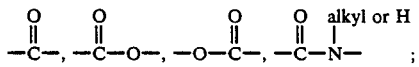

n is an integer from 1 to 20, preferably 1 to 6, and "M+" is hydrogen or an alkali metal cation, preferably sodium or potassium.

A subgroup of preferred polymers includes those containing at least about 50% by weight of vinylidene chloride, but less than about 70%, and about 5 to about 35% vinyl chloride, and about 5 to about 20% of a vinyl compound selected from the group consisting of acrylic acid, methyl acrylate, ethyl acrylate, butyl acrylate, methacrylic acid, methyl methacrylate, acrylonitrile, methacrylonitrile, acrylamide and methacrylamide, and combinations thereof, and about 1 to about 3% by weight of sulfoethyl methacrylate.

A particularly preferred group of latexes, however, includes latexes containing about 30 to about 70 weight % of solids formed by emulsion polymerization of about 50 to about 99% vinylidene chloride based on total weight of polymer and about 0.1 to about 5% by weight of sulfoethyl methacrylate, with optionally other comonomers selected from the group consisting of vinyl chloride, acrylic and methacrylic monomers such as acrylonitriles, acrylamides, methacrylamides and mixtures thereof in amounts between about 5 and about 50% by weight, and substantially free of unpolymerized surfactant or protective colloid.

Among other preferred subclasses of resin for use in this invention include dispersions of copolymers of about 50 to about 90% by weight vinylidene chloride, about 5 to about 30% by weight of butyl acrylate and about 1 to about 2% by weight of sulfoethyl methacrylate based on the total weight of polymer. Another preferred subclass of polymers are the latexes of vinylidene chloride-containing polymers internally stabilized with sulfoethyl methacrylate and free of surfactant, and including optionally vinyl chloride and one or more acrylic comonomers.

Another preferred vinylidene chloride-containing polymer is one comprising about 15 to about 20 weight % vinyl chloride, about 2 to about 5 weight % butyl acrylate, about 3 to about 10 weight % acrylonitrile and about 1 to about 2 weight % sulfoethyl methacrylate. This particular copolymer will have less than 70% by weight vinylidene chloride copolymer based upon total weight of comonomers, including the sulfoethyl methacrylate, used in the emulsion polymerization.

In its most preferred form, the present invention comprises the use of internally stabilized vinylidene chloride-containing resins of the type used in Example 1 reported hereinbelow. Such resins are capable of developing relatively high crystallinity. Exemplary resins are described in U.S. Pat. No. 3,922,451 and the aforementioned U.S. Pat. No. 3,617,368. Generally speaking, vinylidene chloride-containing resins comprise a relatively high proportion of vinylidene chloride, for example, at least about 80 wt. % thereof.

Although internally stabilized vinylidene chloride-containing resins are preferred for use in the practice of the present invention, vinylidene chloride-containing resins stabilized with external surfactants can also be used. The use of such resins forms autodeposited coatings which exhibit chemical and physical properties superior to those of autodeposited coatings prepared from resins heretofore known in the state of the art. The externally stabilized vinylidene chloride-containing resins contain a high proportion of vinylidene chloride, that is, at least about 50 wt. %, and preferably in excess of 50 wt. %. The amount of vinylidene chloride comprising the resin should be less than 100 wt. % for the reason that the pure homopolymer of vinylidene chloride is thermally unstable. It undergoes dehydrochlorination, that is, an "unzippering" depolymerization which leads to complete breakdown of the polymer. The proclivity for thermal instability can be greatly reduced by copolymerizing the vinylidene chloride monomer with comonomers, for example, acrylic comonomers, which can be used to break up the length of the vinylidene chloride sequences by inserting more thermally stable comonomers into the chain thereby preventing further unzippering. In simplistic terms, the use of comonomers in vinylidene chloride polymers is akin to jamming a zipper at a number of points which prevents it from opening more than a short distance.

Examples of monomers that can be copolymerized with vinylidene chloride to form a thermally stable copolymer include one or more of vinyl chloride, acrylic acid, methacrylic acid, methylacrylate, methyl methacrylate, ethylacrylate, butylacrylate, acrylonitrile, methacrylonitrile, acrylamide and methacrylamide. A few examples of externally stabilized vinylidene chloride polymers that can be used in the practice of the present invention are the following: (A) about 50 to about 90 wt. % vinylidene chloride, about 5 to about 20 wt. % acrylonitrile and about 5 to about 20 wt. % butyl acrylate; (B) about 60 to about 76 wt. % vinylidene chloride, about 4 to 10 wt. % ethylhexyl acrylate or methacrylate, and about 1 to about 4 wt. % acrylic acid; and (C) 66 wt. % vinylidene chloride and 34 wt. % vinyl chloride. In preferred form, the externally stabilized vinylidene chloride-containing resin is crystalline in nature.

Externally stabilized resins of the above type are prepared typically by emulsion polymerization utilizing a sufficient amount of surfactant to maintain the resulting resin particles in a dispersed state in the aqueous medium of the reaction mixture. The nature of this resin type is that the structure of the polymer molecule requires that surfactant be present to maintain the colloidal dispersion of the resulting latex, the surfactant being adsorbed on the surface of the resin particles.

Examples of surfactants (emulsifiers) that can be used to prepare such latexes include: sodium dobecylbenzene sulfonate, alkyl sulfates, sodium dioctyl sulfosuccinate, alkylphenolic ethoxylate sulfonates, sodium dodecyldiphenyl oxide disulfonate, sodium oleoyl isopropanolamide sulfosuccinate, and sodium lauryl sulfate. These surfactants or emulsifiers are exemplary only; accordingly, it should be understood that the practice of this invention is not limited to latexes containing the aforementioned surfactants. For example, there can be used any anionic surfactant which will lower the interfacial tension between the monomeric reactants and water sufficiently to result in the formation of stable colloidal dispersions of the monomers in the water and, in addition, is stable in autodepositing compositions formulated therefrom. It is noted further that the activating system (for example, acid and oxidizer) of the autodepositing composition functions to dissolve from the metallic substrate positively charged cations which cause the negatively charged latex polymer particles to autodeposit on the metallic surface. The anionic surfactant should be a material which functions accordingly. Mixtures of two or more suitable anionic surfactants may be used.

For reasons earlier mentioned, and as explained in the aforementioned U.S. Pat No. 4,191,676, the surfactant concentration of externally stabilized latexes should be relatively low so that the aqueous phase of the autodepositing composition has a surfactant concentration below the critical micelle concentration (CMC) and preferably below the surfactant concentration which corresponds to the inflection point on a graph of surface tension versus the logarithm of surfactant concentration in the composition, as referred to in the aforementioned U.S. Pat. No. 4,191,676. Accordingly, it is preferred that the latex containing the externally stabilized resin be prepared by emulsion polymerization with a very low concentration of surfactant. In the present state of the art, this is best achieved by seed polymerization or semicontinuous polymerization as opposed to batch emulsion polymerization. In the seed polymerization process or semicontinuous polymerization, the amount of surfactant can be limited by adding surfactant and monomer in such a manner that the monomer continues to polymerize with particles already present rather than forming new particles. This gives greater uniformity of particle size distribution and also gives good control of the total amount of surfactant in the latex. The stability of the colloidal latex can be partially attributed to charged polymer end groups whose provenance is the polymerization initiator.

In general, such latexes will have a relatively high surface tension, that is, at least about 40 dynes/cm. Such latexes can be used in the practice of the present invention, and preferably, there are used such latexes that have a surface tension of about 55 t0 70 dynes/cm. In particular, such latexes in which there is no protective colloid are a preferred class for use in the present invention.

Polymers having a vinylidene chloride content of between about 50 wt. % and about 90 wt. % or higher, based upon the total weight of polymer, can be used. When vinyl chloride is employed as one of the co-monomers, the vinylidene chloride content may be less than about 70 wt. %. The total chloride content, however, is preferably 50 wt. % or more based on total polymer weight. Generally speaking, the internally stabilized latexes which are the preferred class of latexes according to this invention can be used at even lower chloride contents, thereby enabling the inclusion of other copolymers to enhance the desirable polymer characteristics such as hardness, gloss, solvent resistance and the like, in addition to corrosion resistance attributable to reduced vapor permeability.

Latexes containing vinylidene chloride resins for use in the practice of the present invention are available commercially. Examples of such latexes are the Saran latexes such as for example, Saran 143 and Saran 112 available from Dow Chemical Co., the Serfene latexes available from Morton Chemical, and Haloflex latexes such as, for example, Haloflex 202 available from Imperial Chemicals Industries.

Vinylidene chloride-containing resins of the type described above can be used in autodeposition to form coatings which have highly desirable properties. For example, the coatings can be cured at relatively low temperature, such as temperatures within the range of about 20° C. to about 120° C. Coatings having a very high order of corrosion resistance can be obtained without the use of a chrome after-treatment. In addition, coatings having a high degree of hardness and resistance to solvents can be produced, and the freshly formed coatings can have particularly good adhesive and cohesive properties, as exhibited by their being able to be spray rinsed at relatively high pressures. In accordance with the present invention, the water impermeability of such coating can be improved further by treatment with an alkaline solution, as earlier indicated.

Examples of other resins that can be used in autodepositing compositions are referred to in the following U.S. Pat. Nos.: 3,585,084; 3,709,743; 4,191,676; 4,313,861 and 4,347,172. Coatings formed from such resins can also be treated in accordance with the present invention.

If desired, the autodepositing composition can be prepared from two or more different resins. In a preferred form, such a composition will comprise a blend of the vinylidene chloride-containing polymers described above, typically in an amount of about 50 to about 95% of the total resins solids, and one or more other resins including, for example, styrene-butadiene resins, poly vinyl chlorides, acrylic resins and the like.

The amount of the resin comprising the coating composition can vary over a wide range. The lower concentration limit of the resin particles in the composition is dictated by the amount of resin needed to provide sufficient material to form a resinous coating. The upper limit is dictated by the amount of resin particles which can be dispersed in the acidic aqueous composition. In general, the higher the amount of resin particles in the composition, the heavier the coating formed, other factors being substantially the same. Although coating compositions can be formulated with a range of about 5 to about 550 g/l of resin solids, the amount of the resin solids will tend to vary depending on the other ingredients comprising the composition and also on the specific latex or resin used. For many applications, good results can be achieved utilizing about 50 to about 100 g/l of resin solids in the composition.

Optional ingredients can be added to the coating composition as desired. For example, it is believed that the present invention will be used most widely in applications where it is desired to apply pigmented coatings to a metallic substrate. For this purpose, suitable pigments can be included in the composition. Examples of pigments that can be used are carbon black, phthalocyanine blue, phthalocyanine green, quinacridone red, benzidene yellow and titanium dioxide. The pigment should be added to the composition in an amount which imparts to the coating the desired color and/or the desired depth or degree of hue. It should be understood that the specific amount used will be governed by the specific pigment used and the color of coating desired. Excellent results have been achieved by using the aqueous dispersion in an amount such that the composition contains about 0.2 to about 3 g of furnace black/100 g of resin solids.

Many pigments are available in aqueous dispersions which may include surfactants or dispersing agents for maintaining the pigment particles in dispersed state. When utilizing such pigment dispersions, they should be selected so that the surfactant concentration in the aqueous phase of the composition is below the CMC, preferably below the surfactant concentration which corresponds to the inflection point on a graph of surface tension versus the logarithm of surfactant concentration in the composition. The surfactant should preferably be selected from those indicated above with respect to the preparation of the externally stabilized latexes. Suitable pigmented compositions are illustrated in the examples herein.

Colored coatings can be produced also by the use of dyes, examples of which include rhodamine derived dyes, methyl violet, safranine, anthraquinone derived dyes, nigrosine, and alizarin cyanine green. These are but a few examples of dyes that can be used.

Examples of other additives that may be used in the autodepositing composition are those generally known to be used in formulating paint compositions, for example, UV stabilizers, viscosity modifiers, etc.

If a surfactant is added to the composition, either as a component of the latex, or with a pigment dispersion, or with other ingredient or additives, the total amount of surfactant in the aqueous phase of the composition should be maintained below the CMC. Preferably, the aqueous phase of the composition contains little or no surfactant.

In case a surfactant is utilized, the preferred surfactants are the anionic surfactants. Examples of suitable anionic surfactants are the alkyl, alkyl/aryl or naphthalene sulfonates, for example, sodium dioctylsulfosuccinate and sodium dodecylbenzene sulfonate.

In preparing the autodepositing composition, the constituents thereof can be admixed in any suitable way, for example, as described in aforementioned U.S. Pat. No. 4,191,676. In preparing a bath of pigmented coating composition for use on an industrial scale, it is preferred that the bath be prepared by admixing:

(A) An aqueous concentrate comprising about 350 to about 550 g/l of resin particles, preferably the aforementioned vinylidene chloride-containing resin particles and about 10 to about 550 g/l of pigment; and (B) An aqueous concentrate prepared from about 0.4 to about 210 g/l of HF and a water soluble ferric-containing compound in an amount equivalent to about 1 to about 100 g/l of ferric iron.

The bath can be prepared by stirring water into concentrate (A) and thereafter admixing therewith the required amount of concentrate (B) with stirring to provide a homogenous composition.

Various steps of the overall coating process in which the present invention is used can be like those of the prior art, except as noted below. For example, cleaning of the metallic surface prior to coating can be in accordance with the teachings of aforementioned U.S. Pat. No. 4,191,676. With respect to contacting the metallic surface with the autodepositing composition, it is believed that, for most applications, desired coating thicknesses can be obtained by immersing the metallic surface in the composition for a period of time within the range of about 30 seconds or even less to about 3 minutes. Good results have been achieved utilizing a time of immersion of not more than about 90 to 100 seconds with compositions containing about 5 to 10 wt. % of resin solids. However, it should be understood that longer or shorter periods of time can be used. Agitating the composition aids in maintaining it uniform and in improving the uniformity of the coatings formed. Other factors being held constant, heating of the composition will result in heavier coatings. However, satisfactory results can be obtained by operating the coating process at ambient temperature.

In a typical industrial process, the freshly applied coating is rinsed with water after the coated surface has been withdrawn from the composition and before significant drying of the wet coating takes place. Such water rinsing is effective in removing therefrom residuals, such as acid and other ingredients of the composition, that adhere to the coated surface.

Thus, after the freshly formed, wet uncured coating is rinsed, it is subjected to a reaction rinse chemical treatment in accordance with the present invention, preferably by contacting the coating with an aqueous alkaline solution of amphoteric surface active agent and an alkaline material and/or an alkali metal salt, followed by a rinse with deionized water. Such treatment will maintain the water impermeability of the cured form of the coating and enhance the gloss of the cured coating. For example, and with reference to coatings comprising vinylidene chloride-containing resins of the type mentioned above, wherein the reaction rinse chemical treatment does not contain an alkaline material and/or an alkali metal salt it is found that, although such coatings exhibit excellent resistance to corrosion when evaluated in accordance with a standard salt spray test (ASTM B-117), the adhesion to the underlying metallic substrate is affected adversely when they are soaked in water for an extended period of time, for example, two hours. As will be seen from the examples reported below, treatment of the uncured coating in accordance with the present invention permits the cured coating to successfully pass a test involving extended water soaking.

In preferred practice, the uncured coating is contacted with a solution of one or more soluble reaction rinse materials of this invention. Most preferably, the solution comprises an aqueous solution of an amphoteric surface active agent and an alkaline material such as ammonium hydroxide or an alkali metal hydroxide such as, for example, lithium, potassium, and sodium hydroxide.

Generally speaking, the reaction rinse chemical treatment of the freshly formed coating can be effected at room temperature, although elevated temperatures can be used, with the time of contact, the means of contact, and the temperature of contact being interrelated so as to deposit sufficient chemical on the coating, but not so much as to adversely affect the coating. Suitable means for applying the reaction rinse solution to the freshly formed coating incude spray, mist, and immersion, with excellent results having been achieved by immersing the freshly coated surface in the reaction rinse solution. When using relatively small amounts of material in the reaction rinse solution, contact times will of necessity be much longer than when using a solution containing relatively high amounts of material, for example, amounts which correspond to the saturation level of the material in solution. Preferably, the reaction rinse solution contains about 1.5 to about 7 g/l of amphoteric surface active agent, and from about 0.1 to about 25 g/l of alkaline material, with the preferred means of applying such solution being immersion of the freshly coated surface in the solution for a period of time of about 5 seconds to about 5 minutes.

After reaction rinse chemical treatment of the freshly formed coating in accordance with the present invention, the treated coating can, if desired, be subjected to a plain water rinse, however, optimum results are obtained when the final rinse comprises deionized water. In a process which involves the formation of a coating comprising the preferred vinylidene chloride-containing resins described above, excellent results have been achieved by rinsing the reaction rinse treated coating with deionized water and then proceeding directly to cure the coating.

The conditions under which the curing and/or fusion operation is carried out depend somewhat on the specific resin employed. In general, it is desirable to apply heat to fuse the resin although various of the vinylidene chloride-containing resins described above can be cured at room temperature. Generally, the corrosion resistant, hardness and solvent resistant properties of coatings fused at elevated temperatures have been observed to be better than coatings which have been air dried. However, there are applications where air dried coatings can be used satisfactorily. The fusion of the coating should be carried out under temperature and time conditions which do not adversely affect the desired properties of the coating. Exemplary conditions used in fusing the aforementioned vinylidene chloride-containing coatings are temperatures within the range of about 20° C. to 120° C. for periods of time within the range of about 10 to 30 minutes, depending on the mass of the coated part. Baking the coating for a period of time until the metallic surface has reached the temperature of the heated environment has been used effectively.

When baked in an oven, the coating reaches the proper "curing" or heating temperature for the full development of coating properties when the metal part reaches that temperature. For this reason, parts that are constructed of thicker steel require longer times to reach the required temperature. For massive parts, it may not be possible to reach the required temperature without deleteriously affecting the coating and causing it to degrade. In any event fusion of the resinous coating should be such as to render it continuous, thereby improving its adherence to the underlying metallic surface and its resistance to corrosion.

In some cases, it is possible to overcome this problem by resorting to infrared radiation curing. In this case, it is possible to cure the coating without simultaneously raising the temperature of the metal to the required temperature. However, infrared radiation curing is practicable only for simple geometric shapes since the area to be cured must be exposed to the infrared. In using infrared radiation curing, all coated surfaces must be visible to the infrared source, that is, the entire coated surface must be exposed to the infrared.

Autodeposited coatings can also be "cured" or heated to such a degree that those properties which depend upon proper bake schedule, such as, for example, corrosion resistance, adhesion, and hardness can be readily achieved, even on massive parts, as well as relatively thin wall parts, by the simple expedient of treating the freshly coated part with hot water or steam. By the use of such technique, heat can be transferred more quickly into the coated mass with the result that the temperatures needed for full development of coating properties are reached more quickly than they are reached when heating the coated part in air.

The types of autodeposited coatings that particularly lend themselves to being so cured are those comprising resins which develop fully their coating properties at the elevated temperatures used, that is, temperatures up to 212° F. in the case of water and steam at atmospheric pressure, and higher temperatures in the case of super heated steam and which are not degraded at such temperatures. It is believed that such a curing process will be used most widely in curing autodeposited coatings comprising resins which have a minimum film temperature (MFT) or glass transition temperature (Tg) of no greater than about 140° F., preferably no greater than about 100° F., and most preferably no greater than about 85° F. Vinylidene chloride-containing resins of the type mentioned above can have Tg's within the range of about 30° F. to about 85° F. They can also have an accelerated cure temperature of no greater than about 300° F. With respect to resins having a Tg well below room temperature, improvements can be realized by curing with water having a temperature of at least 70° F. In general, however, it is believed that most curing applications will utilize hot water, for example, water having a temperature of 100° F. or more.

Resins which do not inherently have Tg's or MFT's in the desired range can be modified by the use of solvents or plasticizers in accordance with the state of the art to reduce their Tg and MFT values appropriately.

The temperature and time of treatment of the autodeposited coating will depend upon the nature of the particular resins comprising the coating. The treating conditions should be selected so that the properties of the coating are fully developed and so that the coating is not affected adversely. Exemplary conditions include treating times of about 5 seconds to about 5 minutes (although longer times can be used) at temperatures within the range of about 185° F. to about 212° F. (although higher temperatures can be used in the case of super heated steam). It is believed that many applications will require no more than about 2 to 3 minutes and even less time of treatment when using temperatures within the aforementioned range. Particularly, in the case of steam, there may be many applications in which the treating time is less than 5 seconds. Autodeposited coatings comprising vinylidene chloride-containing resins of the type described above can be properly heated or "cured" to achieve full development of coating properties by immersion of the freshly formed autodeposited coating into hot water for as little as about 5 to about 39 seconds at temperatures of about 185° F. to about 212° F.

The process of reaction rinsing the autodeposited coating in accordance with the present invention is preferably performed by treating the uncured coating in one step employing the reaction rinse materials of this invention. Thus, for example, reaction rinsing is done simultaneously with an aqueous solution of amphoteric surface active agent and alkaline material.

It is generally believed that corrosion of coated metal surfaces occurs when moisture permeates the protective coating and permits the transport of electrons or ions between microcathode- and microanode sites on the metal substrate through the electrolyte. Moreover, the water content of the protective coating significantly affects the adhesion of the coating and, at high humidities, may actually cause the coating to separate from the metal. By decreasing the permeability of the protective coating to moisture, therefore, ionic dissolution, ionic transport and diffusion, osmotic blistering, and losses of adhesion on exposure to high humidity are significantly mitigated.

Polymeric films exhibit decreasing moisture vapor transmission rate (MVTR) as their content of chemically bound chlorine increases. Pure homopolymers of vinylidene chloride, for example, comprise two chemically bound chlorine atoms for each monomer unit or more than 70 wt. %. The MVTR decreases linearly with increasing content of chemically bound chlorine so the homopolmer of vinylidene chloride has a very low permeability, on the order of 10 grams of moisture vapor through a square meter of film 25 microns thick in 24 hours. By comparison, for example, a latex film based on a polymer comprising a 1:1 ratio of methyl methacrylate and butyl acrylate has an MVTR of 1290 g/25 u/m$^2$/day.

The moisture vapor permeability and water sensitivity of vinylidene chloride copolymer films can be deleteriously affected by increasing concentrations of surfactant used in the process for preparation of the vinylidene chloride-containing polymer. In an earlier part of this disclosure, it was shown that high surfactant concentrations are also undesirable in autodeposition. Accordingly, for purposes of this invention, it is preferred that the latex used in formulating the composition and the autodepositing composition itself contain a very low concentration of surfactant or no surfactant.

The vapor permeability, as measured by cast film water vapor transmission rate (WVTR), of preferred resins is less than about 50 g/mil/m$^2$/day and preferably less than 20 g/mil/m$^2$/day. The film of these preferred resins, when applied in accordance with the preferred autodepositing method of this invention, that is, the method which utilizes an autodepositing composition containing a hydrofluoric acid/ferric fluoride activating system, provides a coated surface in which the vapor permeability, based upon improved corrosion resistance, is substantially less than that of a film cast from the same latex.

Preferred operating steps for forming resinous coatings on steel surfaces, for example, car frames made from hot rolled steel, which coatings provide excellent corrosion resistance after being subjected to salt spray (ASTM B117) for at least 500 hours include the following:

(A) cleaning the steel surface, preferably to the extent that a water break-free film can be formed on the surface;

(B) water rinsing the cleaned surface to remove therefrom residual cleaning agent;

(C) immersing the surface in the preferred pigmented coating composition, as described above, for a period of time of about 45 seconds to about 90 seconds to form on the surface a coating having a thickness of about 0.4 to about 1.2 mil;

(D) withdrawing the coated surface from the composition, rinsing the coated surface with water, and, either immediately or after a partial air dry of about 30 to about 60 seconds, chemically treating the freshly formed coating in accordance with the disclosure of U.S. Ser. No. 635,968 now abandoned, and thereafter water rinsing the coated surface; and (E) drying the coated surface at a temperature within the range of about 20° C. to about 120° C. for a period of time of about 10 to 30 minutes.

An alternative to Step (E) above is to immerse the coated part in hot water or subject it to steam as described above. The following examples, other than the control examples, further illustrate and describe methods of treating autodeposited coatings in accordance with this invention, and are not to be considered limitative thereof in any sense. Parts and percentages are by weight unless otherwise indicated.

EXAMPLE 1

This example illustrates the preparation of a metallic surface having an autodeposited resinous coating. The metallic surface comprised steel Q-panels which were cleaned with a conventional alkaline cleaner composition and rinsed with water prior to being coated. The panels were vertically mounted on a hanger and immersed in the autodepositing composition at ambient temperature for about 1 to about 3 minutes. The autodepositing composition comprises the following:

| Ingredients | Amounts |
| --- | --- |
| Saran 143 latex | 93 g (about 5 wt. % resin solids) |
| ferric fluoride | 1.8 g |
| hydrofluoric acid | 2.3 g |
| Aquablak S (black pigment dispersion) | 3 g |
| deionized water | to make 1 liter |

The latex used contains a crystallizable vinylidene chloride-acrylonitrile-butyl acrylate polymer which is prepared by copolymerization with a water soluble ionic stabilizer such as sodium sulfoethyl methacrylate.

The Aquablak S dispersion (available from Bordon) was thinned with an equal weight of deionized water to produce a consistency approximately equal to that of the latex. While stirring continuously, the latex was slowly added to the diluted black pigment dispersion. When the black pigment had been uniformly blended with the latex, deionized water was added with continuous stirring. A solution comprising the hydrofluoric acid and the ferric fluoride was added to the mixture with continuous stirring in such a volume tha the blend approached 1 liter of volume, for example, 950 ml. Deionized water was then added to bring the total volume of composition to 1 liter. The resulting composition comprised about 5% by weight of resin solids.

Following a water rinse step, the coated panels were cured for a total of about 20 minutes.

The cured coated panels were then subjected to a soak test. The test is described in the July 1970 General Motors publication No. GM 4350-M at page P-81.101 and P-81.102, incorporated herein by reference. Procedures for carrying out these tests are detailed in the December 1954 General Motors Publication No. GM 4466-P at page W-67 entitled "Recommended Practice For Water Immersion Testing" and the July 1970 General Motors Publication No. GM 9071-P at pages W-63.601 to W-63.603, entitled "Tape Adhesion Test For Paint Finishes". Simply stated, coated parts are immersed in water for 2 hours at 100° F. Blistering or other appearance changes following immersion represent a coating failure. In addition, a 0.12 inch peel back of coating from the intersection of lines scribed in the coating following water immersion or peeling of the coating following the removal of, for example, No. 710 3M tape applied thereto constitutes a coating failure.

The panels exposed to the soak test experienced no failure. In addition, panels exposed for 500 hours to accelerated corrosion testing per ASTM method B-117 resulted in no blistering of the field and yielded a scribe rating of 6 (ATM D-1654).

Gloss of the cured coated panels was determined by shining a light at a 60° angle on the surface of each panel. Measurements were made using a gloss meter (Gardner ® Gloss Gard, Pacific Scientific, Gardner Laboratory Division, Maryland, USA).

A gloss value of about 5 to about 7 was obtained. Such values are typical for a low gloss (flat) appearance. Higher values, i.e., up to about 100, represent higher gloss when using this technique.

EXAMPLE II

This example shows the improvement in gloss appearance, and how loss in such gloss improvement may be recovered from a used reaction rinse bath of this invention.

Unpolished steel Q-panels having an uncured autodeposited coating as in Example I were treated with (1) a fresh reaction rinse bath comprising about 0.35% wt. of cocamidopropyl betaine in water; (2) a used reaction rinse bath as in (1); (3) a bath as in (2) containing 0.3 g/l of Na$_4$EDTA; (4) a bath as in (2) containing 0.3 g/l of NH$_4$F; and (5) a bath as in (2) containing 0.5 ml/l of B-diketone. The coatings on the panels were cured, and the panels were then evaluated for gloss. The results are summarized as follows:

| Bath | Gloss |
|---|---|
| 1 | yes |
| 2 | no |
| 3 | yes |
| 4 | marginal |
| 5 | yes |

The reduction in gloss of the coated panels (bath 2) was believed to be due to iron build-up in the reaction rinse bath. The addition thereto of an iron chelating agent restored the gloss to the panels. The neutral salt spray test results were also good. However, the water soak/tape adhesion evaluation results were not acceptable.

EXAMPLE III

This example illustrates the loss in performance with respect to the ASTM B-117 neutral salt spray test for accelerated corrosion of steel Q-panels when an alkaline material is present in a reaction rinse bath to provide panels having a cured autodeposited coating as in Example I. The panels having the uncured coating were treated with a fresh reaction rinse bath comprising cocamidopropyl betaine (CAPB) in water, with and without sodium hydroxide; or only sodium hydroxide.

| | Ingredient | Conc | Exposure Time (Hours) | Scribe* Rating | Field Appearance |
|---|---|---|---|---|---|
| 1. | control (none) | | 1,152 | 6.5 | good |
| 2. | NaOH | 0.3%/wt. | " | 7 | blisters |
| 3. | CAPB | 0.35%/wt. | " | 7 | good |
| 4. | CAPB | 0.70%/wt. | " | 7 | good |
| 5. | NaOH and CAPB | 0.3%/wt. 0.35%/wt. | " | 6.5 | blisters |

*Scribe rating (ASTM D-1654)

The accelerated corrosion test results indicate good performances with no reaction rinse or with a reaction rinse comprising cocamidopropyl betaine. Caustic alone or in conjunction with the cocamidopropyl betaine caused blistering of the film. The gloss of the above treated panels was superior to the control sample.

EXAMPLE IV

This example shows performance results when using a reaction rinse bath comprising about 0.35% / wt. of cocamidopropyl betaine in water and about 3 g/l of sodium hydroxide, followed by a deionized water rinse.

Unpolished steel Q-panels having an autodeposited coating prepared as in Example 1 were treated with the aforedescribed reaction rinse bath for about 1 minute at ambient temperature and then rinsed with deionized water.

The panels were then water-soaked for 2 hours at about 100° F., after which time they were found to have a gloss rating of between 33 and 38 and no loss of coating from the tape adhesion test. Another set of panels were treated as above, but without a deionized water rinse, and then water soaked for 2 hours at about 100° F. These panels were found to have a gloss rating of 37 to 39, but a total loss of adhesion when the tape was pulled therefrom.

Another reaction rinse bath was prepared comprising about 0.70%/wt. of cocamidopropyl betaine in water and about 3 g/l of sodium hydroxide. This bath was used to treat steel panels prepared as in Example 1 for about 1 minute at ambient temperatrue, and then rinsed with deionized water. The panels were then water-soaked for about 2 hours at about 100° F., after which time they were found to have an excellent gloss appearance. Tape adhesion (3M tape 610) after 2 and 5.5 hours water soak, respectively, showed no loss of adhesion.

EXAMPLE V

This example shows that separating the sodium hydroxide and the cocamidopropyl betaine rinse solutions adversely affects the results of the water-soak and tape adhesion tests. (A) Unpolished steel Q-panels having an uncured autodeposited coating prepared as in Example 1 were rinsed with (1) an aqueous solution containing 3 g/l of sodium hydroxide, and then (2) with an aqueous solution containing 0.35%/wt. of cocamidodropyl betaine. (B) Q-panels as in (A) above were rinsed with solutions (1) and (2), except in reverse order.

The panels from tests (A) and (B) were water-soaked for 2 hours at about 100° F. and evaluated by the tape adhesion test. A total loss of coating adhesion was found in both cases.

EXAMPLE VI

This example demonstrates the neutral salt spray performance results obtained when treating unpolished steel Q-panels having an uncured autodeposited coating prepared as in Example I with various reaction rinse solutions and different final rinse materials. The test results are summarized below in Table 1. All treated test panels were cured for 20 minutes at 100° C.

TABLE 1

| Sample | Reaction rinse | Final rinse | Salt Spray hrs. | Scribe Rating* | Field |
|---|---|---|---|---|---|
| 1 | none | — | 864 | 6–7 | 10 |
| 2 | none | — | 864 | 6–7 | 10 |
| 3 | 0.35%/wt. cocamido propyl betaine and 3 g/l NaOH | — | 984 | 6–7 | poor, blisters |
| 4 | same as 3 | deionized water | 984 | 7 | 10 |
| 5 | 0.70%/wt. cocamido propyl betaine and 3 g/l NaOH | deionized water | 984 | 7 | 10 |
| 6 | same as 3 | deionized water | 500 | 7–8 | 10 |
| 7 | same as 3 | tap water | 500 | 7 | 10 |
| 8 | 5 g/l Na4P2O7 | deionized water | 500 | 6 | 10 |
| 9 | 10 g/l Na4P2O7 | deionized water | 500 | 6 | 10 |
| 10 | 10 g/l Na4P2O7 | tap water | 500 | 6 | 10 |
| 11 | 0.35%/wt. cocamido propyl betaine and 10 g/l Na4P2O7 | deionized water | 500 | 7 | 10 |

*Scribe rating (ASTM D-1654)

EXAMPLE VII

This example illustrates the results obtained when using tap water having a total hardness of about 815 p.p.m. or deionized water for the final rinse. Steel Q-panels were dip-cleaned, dip rinsed, spray rinsed, dipped for 2 minutes at ambient temperature in a coating bath as in Example I, allowed to dwell for 1 minute, dip-rinsed in tap water, allowed to dwell for 1 minute, dipped in a reaction rinse (as shown below) for 1 minute at ambient temperature, allowed to dwell for 1 minute, and given a final rinse (as noted below) for 30 seconds at ambient temperature, and then cured for 20 minutes at 100° C.

The reaction rinse solution, the final rinse solution, and the appearance of the panels are summarized below in Table 2.

TABLE 2

| Reaction rinse | Final rinse | Panel Appearance |
|---|---|---|
| (1) 0.35%/wt. cocamido- propyl betaine and 3 g/l NaOH | deionized water | fairly uniform gloss, slight texturing |

TABLE 2-continued

| Reaction rinse | Final rinse | Panel Appearance |
|---|---|---|
| (2) same as (1) | tap water | flat, with glossy edges - flocculation |

As can be seen from the foregoing, the mineral content of the weter used for the final rinse can greatly affect the gloss properties of the panels.

EXAMPLE VIII

This example illustrates comparative gloss values between a group of panels having an uncured autodeposited coating as in Example I treated with a reaction rinse of this invention, and control panels not so treated. The reaction rinse comprised a 0.35%/wt. aqueous solution of cocamidopropyl betaine and 3 g/l NaOH. The final rinse was deionized water. The results are summarized in Table 3 which follows.

TABLE 3

| Reaction rinse; deionized water final rinse | | | Controls | | |
|---|---|---|---|---|---|
| Panel # | Film Build | 60° Gloss | Panel # | Film Build | 60° Gloss |
| 1 | .62 | 30 | 1C | .59 | 12 |
| 2 | .62 | 31 | 2C | .54 | 11 |
| 3 | .59 | 31 | 3C | .55 | 12 |
| 4 | .62 | 34 | 4C | .55 | 12 |
| 5 | .61 | 32 | 5C | .54 | 11 |
| 6 | .62 | 34 | 6C | .58 | 10 |
| 7 | .60 | 37 | 7C | .60 | 10 |
| 8 | .63 | 35 | 8C | .57 | 11 |
| 9 | .60 | 30 | 9C | .53 | 15 |
| 10 | .58 | 34 | 10C | .57 | 11 |
| 11 | .53 | 36 | 11C | .52 | 14 |
| 12 | .50 | 37 | 12C | .62 | 14 |
| 13 | .56 | 36 | 13C | .59 | 12 |
| 14 | .56 | 40 | 14C | .55 | 13 |
| 15 | .51 | 36 | 15C | .53 | 13 |
| 16 | .54 | 40 | 16C | .61 | 20 |
| 17 | .57 | 37 | 17C | .62 | 20 |
| 18 | .56 | 32 | 18C | .59 | 15 |
| 19 | .60 | 34 | 19C | .58 | 14 |
| 20 | .63 | 33 | 20C | .57 | 12 |
| 21 | .61 | 32 | 21C | .58 | 11 |
| 22 | .60 | 31 | 22C | .55 | 14 |
| 23 | .65 | 30 | 23C | .54 | 14 |
| 24 | .61 | 31 | 24C | .59 | 14 |
| 25 | .63 | 38 | 25C | .60 | 12 |
| 26 | .62 | 38 | 26C | .56 | 15 |
| 27 | .58 | 39 | 27C | .54 | 12 |
| 28 | .59 | 34 | 28C | .54 | 13 |
| 29 | .59 | 35 | 29C | .59 | 16 |
| 30 | .61 | 32 | 30C | .56 | 15 |
| 31 | .56 | 32 | 31C | .57 | 15 |
| 32 | .56 | 31 | 32C | .57 | 19 |
| 33 | .56 | 33 | 33C | .60 | 16 |
| 34 | .58 | 27 | 34C | .58 | 12 |
| 35 | .58 | 26 | 35C | .57 | 14 |
| 36 | .57 | 29 | 36C | .57 | 20 |
| 37 | .58 | 30 | 37C | .55 | 12 |
| 38 | .60 | 32 | 38C | .56 | 17 |
| 39 | .56 | 32 | 39C | .61 | 15 |
| 40 | .59 | 30 | 40C | .60 | 14 |
| 41 | .61 | 22 | 41C | .64 | 15 |

EXAMPLE IX

This example illustrates the maintenance of gloss values for panels having an autodeposited coating as in Example I treated with a reaction rinse of this invention comprising a 0.35%/wt. aqueous solution of cocamidopropyl betaine and 3 g/l NaOH, followed by a final rinse with deionized water. In addition, average film build values for 12 panels are given. The results are summarized in Table 4 showing the average gloss values for 12 panels when passing the panels through the reaction rinse simulating continuous use. Materials which were consumed were replaced on an ongoing basis without any other additions or changes in the process.

TABLE 4

| ft²/l | 60° gloss | film build (mils) | 24 hr. water soak/adhesion |
|---|---|---|---|
| 0 | 31 | 0.64 | pass |
| 5 | 26 | 0.60 | pass |
| 10 | 26 | 0.56 | pass |
| 15 | 25 | 0.55 | pass |
| 20 | 29 | 0.58 | pass |
| 25 | 29 | 0.56 | pass |
| 30 | 27 | 0.61 | pass |
| 35 | 25 | 0.61 | pass |
| 40 | 28 | 0.58 | pass |
| 45 | 25 | 0.57 | pass |
| 50 | 26 | 0.54 | pass |

I claim:

1. A process of enhancing the gloss and maintaining the corrosion resistance of a non-glossy cured autodeposited resinous coating on a metallic surface comprising contacting an uncured autodeposited resinous coating present on a metallic surface with a reaction rinse containing from about 0.05 to about 5%/wt of an amphoteric surface active agent and from about 0.01 to about 2.5%/wt of an alkaline material, rinsing said coating with water, and then curing said coating.

2. A process according to claim 1 wherein said amphoteric surface active agent is selected from the group consisting of an amine, a substituted or unsubstituted polyamine, a betaine, and a amidobetaine.

3. A process according to claim 1 wherein said amphoteric surface active agent comprises an amidopropylamine oxide having the empirical formula

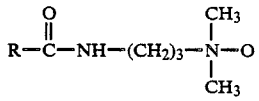

where R=coco.

4. A process according to claim 1 wherein said amphoteric surface active agent comprises a betaine having the empirical formula

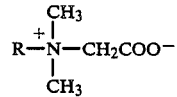

where R=coco.

5. A process according to claim 1 wherein said amphoteric surface active agent comprises an amidobetaine having the empirical formula

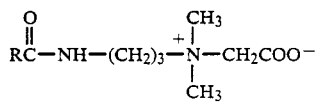

where R=coco.

6. A process according to claim 1 wherein said amphoteric surface active agent comprises a fatty acid polyamine.

7. A process according to claim 1 wherein said alkaline material is selected from the group consisting of ammonium hydroxide, lithium hydroxide, potassium hydroxide, and sodium hydroxide.

8. A process according to claim 1 wherein said step of rinsing said coating is performed with tapwater.

9. A process according to claim 1 wherein said step of rinsing said coating is performed with deionized water.

10. A process according to claim 1 wherein said autodeposited coating is formed from an autodepositing composition consisting essentially of particles of resin dispersed in an aqueous solution prepared from hydrofluoric acid and ferric fluoride and wherein said resin comprises an internally stabilized vinylidene chloride copolymer or an externally stabilized vinylidene chloride copolymer containing in excess of 50 wt. % of vinylidene chloride.

11. A process according to claim 10 wherein said copolymer comprises vinylidene chloride and one or more monomers selected from the group consisting of vinyl chloride, acrylic acid, methacrylic acid, methylacrylate, ethylacrylate, butylacrylate, methyl methacrylate, acrylamide, methacrylamide, acrylonitrile and methacrylonitrile.

12. A process according to claim 11 wherein said copolymer is stabilized with a water-soluble copolymerizable material having the formula:

$$R-Z-Q-SO_3^-M^+$$

wherein R is vinyl or alkyl substituted vinyl, Z is a difunctional linking group, Q is a divalent hydrocarbon group, and M is a cation.

13. A process according to claim 12 wherein said water-soluble copolymerizable material is sulfoethylmethacrylate.

14. A process according to claim 1 wherein said metallic surface comprises a ferriferrous surface.

15. A process according to claim 1 wherein said contacting step is performed by spray, mist, or immersion for between about 5 seconds to about 5 minutes.

16. A process of enhancing the gloss and retaining the corrosion resistance of a non-glossy cured autodeposited vinylidene chloride copolymer coating on a ferriferrous surface comprising contacting an uncured coating of said copolymer present on said surface with a reaction rinse composition containing from about 0.05 to about 5%/wt of an amphoteric surface active agent and from about 0.01 to about 2.5%/wt of an alkaline material, rinsing said coating with water, and then curing said coating.

* * * * *